May 5, 1936. S. PARISH 2,039,341
PROJECTOR OR CAMERA SHUTTER MECHANISM
Original Filed April 27, 1932 2 Sheets-Sheet 1
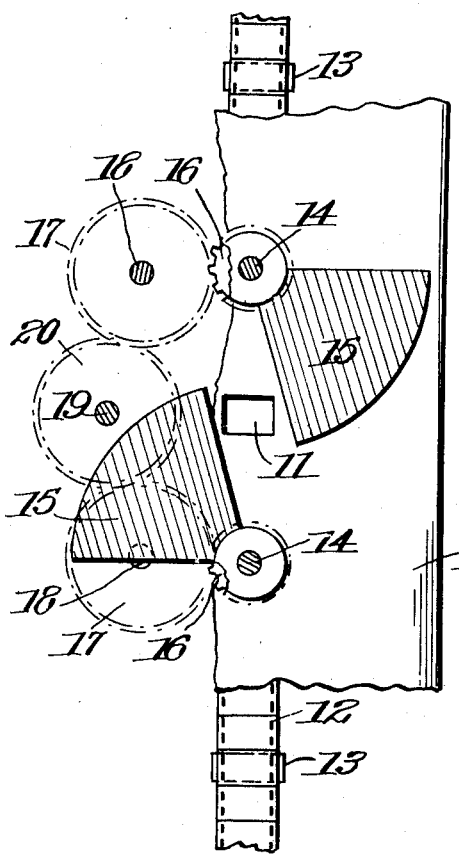
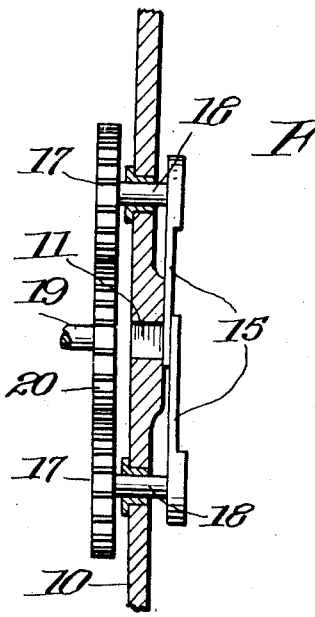
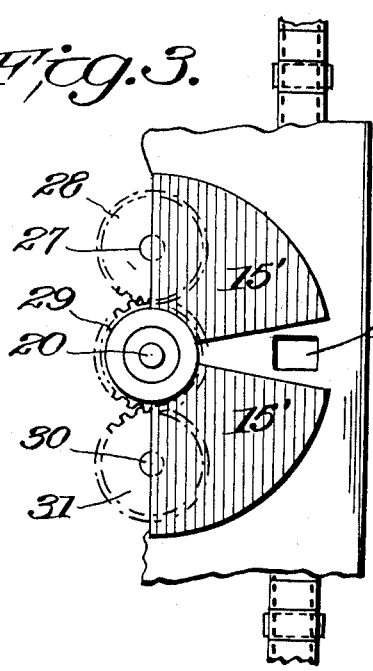
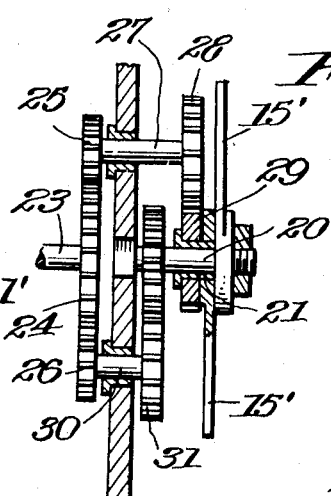
Inventor,
S. Parish,
By
Attorneys.

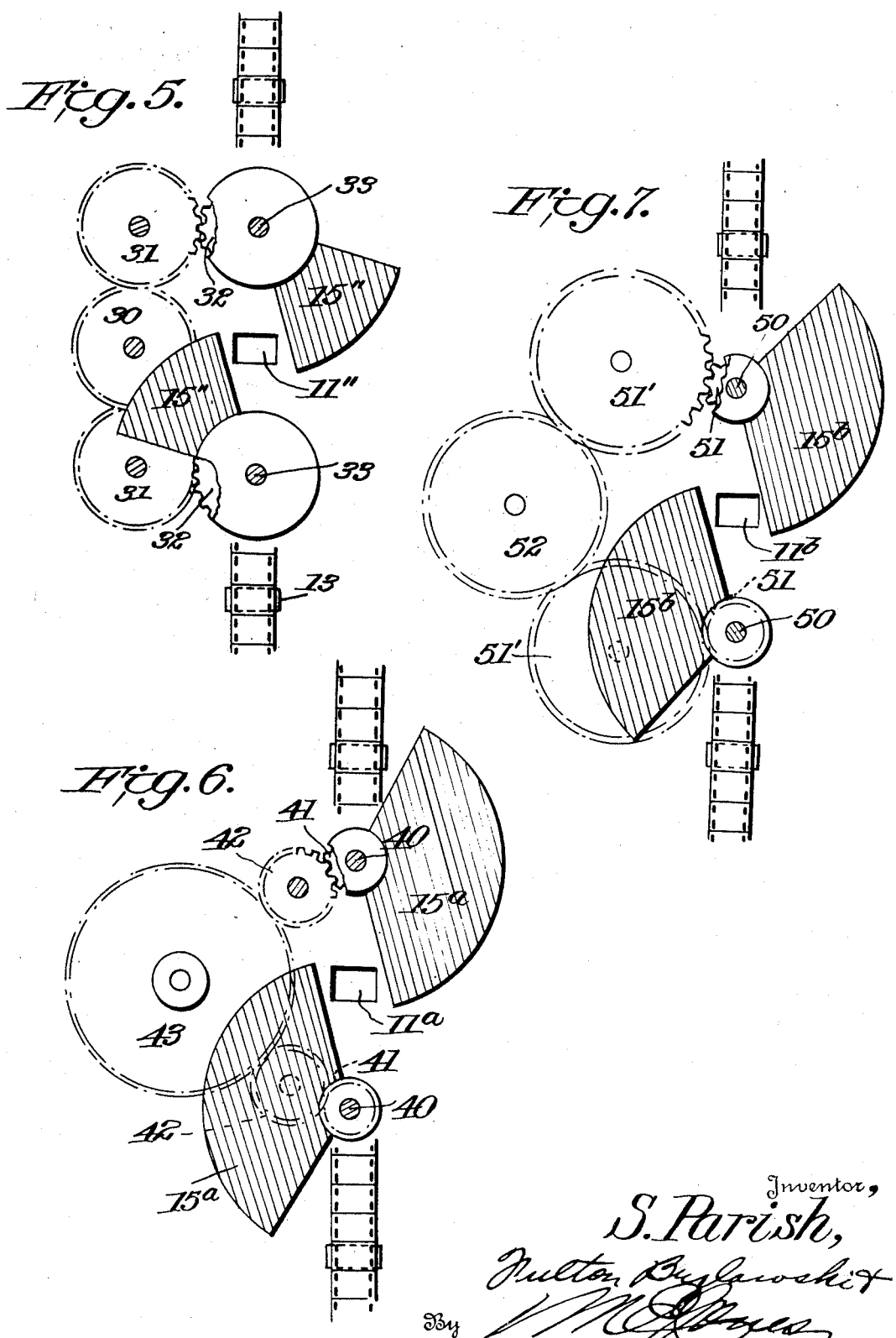

Patented May 5, 1936

2,039,341

UNITED STATES PATENT OFFICE 2,039,341

PROJECTOR OR CAMERA SHUTTER MECHANISM

Scott Parish, Cleveland, Ohio

Application April 27, 1932, Serial No. 607,824
Renewed July 30, 1935

1 Claim. (Cl. 88—19.3)

This invention relates to a shutter mechanism for picture projecting apparatus, cameras and the like.

The main object of the invention is to provide a novel shutter mechanism whereby materially more light, for instance 50% and better, is furnished the film or picture when at rest.

Another object is to provide a construction wherein the picture or film is subject to full light much longer and wherein the light is applied much quicker than in existing constructions. Tests show that by reason of the invention, the full light remains on for instance 80% longer than in existing constructions and is applicable at least 80% quicker than is at present true.

A further and more specific object is to provide the shutter mechanism as a pair of segmental blades, mounted on different shafts rotating in opposite directions at materially greater or double the speed of the film-operating claws or equivalent means.

The more specific objects and advantages will become apparent from a consideration of the description following taken in connection with accompanying drawings illustrating an operative embodiment.

In said drawings:

Fig. 1 is a diagrammatic view partly in front elevation and partly broken away and in section illustrating one form of the invention;

Fig. 2 is a vertical sectional view taken on the line 2—2 of Fig. 1;

Fig. 3 is a fragmentary view partly in front elevation and partly in section through a modified form of the invention;

Fig. 4 is a vertical section taken on line 4—4 of Fig. 3;

Fig. 5 is a fragmentary front elevation or diagram of a third form of the invention;

Fig. 6 is a fragmentary front elevation or diagram of a fourth form of the invention, and Fig. 7 is a fragmentary front elevation or diagram of a fifth form of the invention.

Referring specifically to the drawings and first to the form of Figs. 1 and 2, 10 generally designates a projector having a usual projecting opening 11 of rectangular form across which a film 12 is fed intermittently as usual by claw or equivalent mechanism 13.

Journalled on the projector 10 are two parallel shafts 14 to each of which is keyed a solid or imperforate metallic or other opaque shutter member 15 in the form of a segment. On the shafts 14, pinions or gear wheels 16 are keyed. Enmeshed with the pinions 16 are gear wheels 17, similar in size, carried by shafts 18. A shaft 19, driven in any suitable way from the motor of the projector 10, has a gear wheel 20 keyed thereon and enmeshed with both gear wheels 17 to drive them in opposite directions at the same speed and accordingly drive the pinions 16, shafts 14 and shutter members 15 in opposite directions and at the same speed. With this construction there is a two to one gear movement causing each single blade or shutter 15 to serve as a dark shutter and as a flicker shutter in the same time as with a standard two blade shutter running in correct time with the film advancing claw or equivalent 13. The shutter blades 15 run at twice the speed of an ordinary two blade shutter and at twice the speed of advance of the film, or in other words, there are two revolutions of each of my improved shutter blades to each still picture as the latter advances past the aperture. Usually the blades 15 revolve 2880 revolutions per minute.

Relatively, when the standard two blade shutter is fully 80% closed, the shutters 15 running at double the speed thereof are wide open but still close in exactly the same time, and are wide open when the standard two blade shutter is only 20% open, thereby registering over 50% increase in illumination to the screen per candle power of light. The blades 15 rotating in opposite directions, are as close together as practical when they overlap so as to avoid interference. Such blades 15 come together at the center of the opening 11 and also open from such center.

In Figs. 3 and 4, a modification is shown wherein the same results are attained as with the form of Figs. 1 and 2. Here the projection opening is shown at 11' and blades 15' correspond with blades 15. Such blade shutters 15' are carried by separate shafts 20 and 21, the former being in front of the drive shaft 23. Shaft 21 is hollow and surrounds the shaft 20. On drive shaft 23 is a gear 24 enmeshed with gears 25 and 26. Gear 25 is keyed to a shaft 27 having a gear 28 thereon in mesh with a gear 29 rigid with hollow shaft 21 and one of the shutter blades 15'. Gear 26 is carried by a shaft 30 also having a gear 31 thereon meshing with a gear 32 on shaft 20. The shutters 15' are thus driven at the same speed and function exactly as the blades 15.

The modified form of Fig. 5 employs shutters 15" operable to come together in the center and open from the center of the projection opening 11". Such shutters 15" rotate in opposite directions and in the same speed as the claw movement or equivalent 13 on standard projectors. These shutters operate as close together as practical without interference and so that there is no overlapping of light as they close and open. The driving gear is shown at 30 in mesh with gears 31 of similar size which in turn mesh with gears 32 of similar size carried by shafts 33 which mount the shutter blades 15''.

The form of Fig. 6 attains substantially the same results as the form of Figs. 1 and 2 or 3 and 4. In this form the projection opening is shown at 11ª and the shutter blades at 15ª. A four to one gear movement is here used giving three flicker shutters to one dark shutter and having a very pronounced dissolving effect. The film however moves at standard speed as in all previous forms. Running at the speed mentioned, the shutter blades 15ª are wide open when the old two blade standard shutter is about 95% closed and at the same time closing complete with the old standard shutter and opening in the same ratio. This shutter registers over 50% increase in illumination to the screen per candle power of light. As to the gearing, shafts 40 having the shutters 15ª thereon, also carry pinions 41 with which similar size gears 42 mesh and which are driven by a larger drive gear 43. The shutters 15ª make 5860 revolutions per minute.

The modification of Fig. 7 utilizes the same principles as the preceding form. It has shutter blades 15ᵇ which make 4320 revolutions per minute relative to a projection opening 11ᵇ. Shutter blades 15ᵇ are carried by shafts 50 having pinions 51 of similar size keyed thereon and meshing with similar sized gears 51' which both mesh with a driving gear 52 of the same size as gears 51'. This form gives a three to one gear movement, giving two flicker shutters to each dark shutter for a pronounced dissolving effect. In comparison, the one blade shutters 15ᵇ are fully open when the old two blade shutters on standard projectors are 90% closed and at the same time closes complete with the standard shutter and opens in the same ratio. This shutter mechanism registers over 50% increased illumination to the screen per candle power of light.

It may be mentioned for comparison purposes that the speed of the shutter referred to as used in standard projectors is 1440 revolutions per minute.

It will be realized that the invention discloses a pair of single blade shutters, each mounted on a separate shaft rotating in opposite directions at double the speed of the pull down claws or equivalent, allowing longer exposure of light on the film while at rest either in a projector or camera.

When present two blade rotating shutters are four fifths of the way closed, just before the film is advanced, my shutter blades are wide open and after the film is advanced and again comes to rest and the present two blade rotating shutters are one fifth of the way open, my dual one blade shutters are wide open, and because of their double speed, my dark shutter has revolved around again to make the necessary flicker shutter in the correct time. With the present two blade shutter running at one half the speed this action by tests develops an increase of illumination to the screen of 50% more or less.

Various changes may be resorted to provided they fall within the spirit and scope of the invention.

I claim as my invention:

In a shutter mechanism of the class described having a projection aperture, means to intermittently advance film across the aperture, shutter members disposed on opposite sides of the aperture each consisting solely of a single blade, separate shafts carrying said shutter members, a gear on each shutter member shaft, a driving means and a multiplying gear connection between said driving means and each of said shutter member shaft gears to drive each of said shutter member shafts in the same direction at the same speed and at two revolutions for each film advancing movement of the intermittent feed.

SCOTT PARISH.